Jan. 31, 1950  A. D. DOUGLAS  2,496,002
PICKUP FOR HARVESTER GATHERING REELS
Filed Jan. 31, 1947
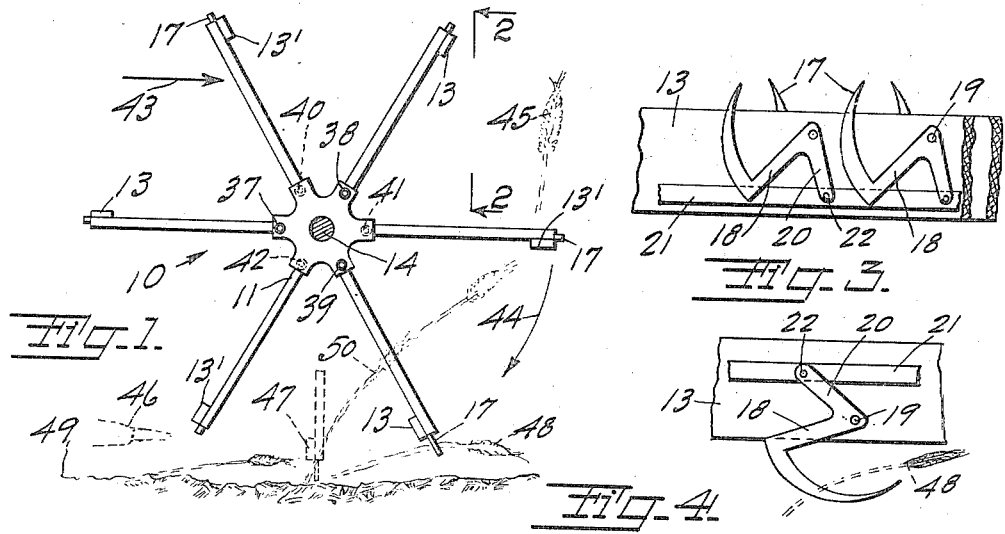
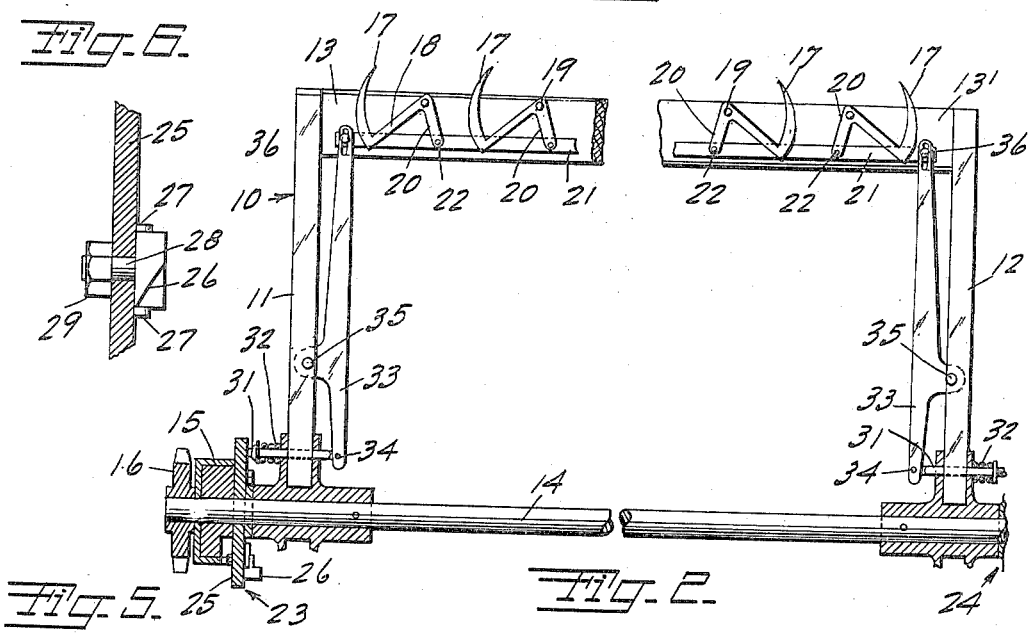
INVENTOR.
Arthur D Douglas
BY
Philip A. Fredell
Attorney Patented Jan. 31, 1950

2,496,002

UNITED STATES PATENT OFFICE 2,496,002

PICKUP FOR HARVESTER GATHERING REELS

Arthur D. Douglas, Berkeley, Calif.

Application January 31, 1947, Serial No. 725,635

3 Claims. (Cl. 56—226)

This invention relates to harvesting machines, particularly reapers and combines which incorporate a gathering reel for gathering or advancing the standing grain stalks to the cutter or shears as the machine moves forward in a stand of grain.

These reels conventionally consist of the end spiders with a series of equally spaced sweeps which enter at the top of the stand of grain and sweep the grain backwardly toward and back over the mower to fall rearwardly thereof as it is cut.

These conventional reels can only gather standing grain. It is very unusual for any field of grain to be free of flattened grain and in some cases particularly when the grain is ripe or nearly ripe, a storm can flatten the greater part of the crop. A loss of 30% of the crop because of flattening by wind or storm is quite common, and in some cases so much of the grain is flattened that ordinary harvesting means would prove unprofitable and to save the harvest it may even be necessary to use scythes with or without cradles, which obviously is the original method, but involves a great deal of time and labor.

Reels have been provided with pick-ups but such as have been used are capable of picking up only a portion of the grain stalks which lie in some specific position relative to the path of travel of the harvesting machine. One type consists of hooked members intended to move downwardly into the flattened crop with the stalks supposedly springing back into the hooks, but this type of device could pick up only such stalks as lie parallel or substantially parallel to the path of travel of the machine and only a portion of that because of the spacing between the hooked members.

Another type uses hook members which operate parallel with the path of travel and therefore would be incapable of picking up any grain other than that which lies transversely to the path of travel, and only a portion of that because of the spacing of the members.

With my invention applied to a reel, substantially all of the fallen grain will be raised, advanced to the cutter head and therefore be saved, because this improved type of pickup will raise all fallen grain irrespective of its lay relative to the path of travel of the machine. It operates at right angles to the path of travel and because of the undersweep of the sweep, it operates on a diagonal path and thus will engage grain stalks whether they lay with the path of travel, at right angles thereto or diagonally, and the pick-ups operate only through a small arc of travel of the reel, just sufficient to raise the grain sufficiently to be caught and advanced to the cutters by the next sweep, releasing the stalks before traveling sufficiently far to break them.

The objects and advantages of the invention are as follows:

First, to provide a pick-up for harvester gathering reels which will pick up flattened grain stalks irrespective of the direction of their lay relative to the path of travel of the harvester, and advance the raised stalks to the cutter head.

Second, to provide a pick-up as outlined which operates only during a short arc of travel of a sweep when in its lowermost position and releases the raised grain stalks before there is any possibility of breaking or bending the stalks.

Third, to provide pick-ups on the respective sweeps of a harvester reel each of which operates only in its lowermost path of revolution and only during a brief period, releasing the stalks before bending occurs for further advance by the next sweep.

Fourth, to provide pick-ups on the alternate sweeps of a harvester reel which operate at right angles to the path of the harvester and in opposite directions.

Fifth, to provide pick-up means for a harvester reel of the type outlined which can be made operative or in-operative at will, for use with flattened grain and non-use when practically all grain is standing.

Sixth, to provide pick-up means as outlined which operates in a path parallel to the sweeps and has a diagonal path of operation relative to the earth because of movement of the sweep and harvesting machine.

Seventh, to provide pick-up means for a harvester gathering reel which is of the highest efficiency, requires little power for operation, is economical to construct and simple in operation, and which does not interfere with normal functioning of the gathering reel.

In describing the invention reference will be made to the accompanying drawings, in which:

Fig. 1 is a side elevation of a gathering reel with my invention applied thereto.

Fig. 2 is an enlarged fragmentary view showing the opposed pick-up elements on two adjacent sweeps and the operating means therefor and corresponds to a view in the direction 2—2, of Fig. 1.

Fig. 3 is an enlarged fragmentary view showing the staggered relation between the pick-ups on alternate sweeps.

Fig. 4 is a fragmentary view showing one of the pick-ups in the act of raising a grain stalk.

Fig. 5 is a side elevation of one of the actuating cams.

Fig. 6 is a section taken on line 6—6 of Fig. 5, with the cam member shown solid.

The conventional harvester, combine, or the like is provided with a gathering reel 10 which is operated in advance of the mower or cutters and which reel includes spiders 11 and 12 at the respective ends and a plurality of equi-angularly spaced cross-members or sweeps 13 which advance over the top of the grain and sweep down within the stand and gather the grain back to the cutters and thereover so as to cause the grain to fall back onto the apron or conveyor, the structures are arrangements of which are well known in the art and therefore require no description and are not illustrated.

This conventional type of sweep is fixedly mounted on a shaft 14 the ends of which are trunnioned in the carrier arms or reaches 15 which support the reel at a predetermined height above the ground, and this shaft is driven by suitable means such as a sprocket 16 and chain at a predetermined speed relative to the ground speed of the machine.

As is readily apparent, this conventional type of reel can only gather standing grain, and has no effect on flattened grain, and therefore by its use all flattened grain is lost.

My new pick-up means overcomes substantially all of the loss in flattened grain, and consists of a series of pick-up devices on each sweep, each of which consists of a tine 17 preferably of arcuate form as illustrated with the base end terminating in one arm 18 of a bellcrank lever and with the bellcrank lever pivoted at 19 near the outer edge of the sweep, and the other arms 20 of all of the bellcrank levers on each sweep pivotally connected to a connecting rod 21 as indicated at 22. Thus all pick-ups on a sweep operate in unison.

As illustrated in Fig. 2, the pick-ups on alternate sweeps operate in opposite directions, sweep 13 being broken away to show the opposed position of the pick-ups on the next following sweep 13', and Fig. 3 shows the staggering of these pick-ups on the alternate sweeps, and being staggered so that successive tines will reach any fallen grain which may have been missed by the preceding sweep.

The operating means consists of cams 23 and 24 fixedly mounted on the respective reaches 15 and each of which consists of a disc 25 on which is adjustably and removably mounted a cam member 26, this cam member being illustrated as slidably held between gibs 27 and secured in adjusted position by an integral bolt 28 and nut 29 with the bolt slidable in a slot 30. It will be noted that the slot does not extend beyond the limits of the gibs so as to maintain an unbroken circular track for the plunger 31 which is slidable through the spoke 11 or 12 of the spider and which is urged into continuous cooperation with the disc 25 by a spring 32, and this plunger is pivotally connected to one end of a lever 33 as indicated at 34. The lever 33 is intermediately pivoted to the spoke as indicated at 35 in any suitable manner and the other end of this lever is suitably connected to the connecting rod 21 as indicated at 36, there being one of these levers and plungers for each sweep, but alternately located on opposite ends of the reel, plungers 37, 38 and 39 (refer to Fig. 1), being located in one spider, and plungers 40, 41 and 42 being located in the spider at the other end of the reel.

Thus the tines on every other sweep will be operated by the cam 23, and those on intervening sweeps by the cam 24, and they are operated only when the sweeps approach their lowermost position, the plungers riding on the plain surface of the disc during the major portion of each revolution.

The operation of the invention is as follows: As the reel 10 moves forward in the direction indicated by the arrow 43 and is rotated in the direction of the arrow 44, the sweeps pass down in through the standing grain 45 and gather this standing grain back to the cutter head 46. As the sweep approaches its lower dead center at 47 the plunger 31 for that sweep engages the cam member 26 and is forced back, operating the lever 33 to move all of the tines out and forward to pass under the flattened grain 48, these tines operating close to the ground 49 and raising these stalks as indicated at 50. Just as the sweep reaches this lowermost position, the plunger passes over the follow edge of the cam member and the spring 32 forces the plunger back against the disc and draws the lever 33 in at its inner end and out at the outer end, returning the tines to their retracted position which retracted position is maintained until that sweep again approaches its lowermost position.

With the stalks in the raised position and released because of retraction of the tines on the first sweep, the following sweep meets the raised stalks and gathers them back to the cutter head along with the standing grain, the release being suitably timed to prevent bending or breaking of the stalks.

If any flattened stalks are missed by the first sweep, the following sweep has its tines operating in the opposite direction, and they are staggered transversely on the respective sweeps, so that the entire area will be covered and operated upon.

It will be noted that when the tines are moved out to engage the flattened stalks that the sweep is simultaneously moving in a rearward direction, which causes the points of the tines to advance diagonally, thus with the staggered pick-ups, and the pick-ups operating in opposite directions on the respective sweeps, and the diagonal movement of the point of the tines, that all flattened stalks will be encountered irrespective of their lay or the angle of lay relative to the path of travel of the harvester.

When there is no flattening of the grain, that is, when the grain is substantially all standing, the pick-ups will not be required, and for that reason the cam member is made adjustable and removable, so that it can be removed completely if desired, or merely adjusted back out of the path of the plungers. This latter procedure is most desirable because of possible loss in case of removal. This arrangement also permits replacement of cam members when necessary. The gibs or other suitable holding means is essential since the path of the plungers must be unbroken and uninterrupted and a suitable type of holding means must be used to secure the cam member in its cooperative position when adjusted to operate the plungers.

It will be noted that the pick-ups are normally in a retracted position and that they are advanced only when the sweep approaches its lowermost position, and that they return to their retracted position when the lowermost position is reached so as to release the raised grain, to prevent breakage of the stalks.

I claim:

1. In a harvesting machine having a cutter, a gathering reel and a shaft therefor and driving means for the shaft and a support therefor, said reel having a plurality of equi-angularly spaced sweeps; pick-up means associated with said sweeps comprising hooking elements operating in planes parallel to the sweeps and mounted on the front faces of the sweeps, and means co-operating between said hooking elements and the support for normally retracting the hooking elements substantially to the peripheral edge of the sweeps, and for advancing the hooking elements to engage under flattened grain during the lowermost portion of travel of the respective sweeps and for releasing the hooking elements for retraction to clear the cutter and to release the raised grain when the lowermost position is reached to prevent breaking the grain stalks, and for advance to the cutter by the next sweep; in which the hooking elements on alternate sweeps are oppositely mounted for engaging under the grain stalks from opposite directions and operated sequentially in opposite directions for picking up grain stalks laying angularly in different directions relative to the path of travel of the harvester.

2. In a gathering reel having equi-angularly spaced sweeps; a plurality of equally spaced hooking elements mounted on the front face of each sweep for convenient clearing of obstructive material and operative in a plane parallel to the front face of the sweep and including each a tine terminating in a lever portion intermediately pivoted on axes at right angles to the axis of the reel; spring means including connecting elements for normally retracting said tines substantially to the periphery of the sweep, and cam means including said connecting elements for advancing said tines to engage under flattened grain stalks during the lowermost portion of movement of the sweep and for releasing the tines for retraction when the sweep reaches substantially its lowermost position to free the stalks for cooperation with the next following sweep and advance to the cutter and for clearing the cutter; in which said tines on respective sweeps are oppositely mounted for engaging flattened stalks from opposite sides to compensate for various angularities of lay of the stalks relative to the path of travel of the reel, and in which individual spring means and individual cam means, including said connecting elements are provided on opposite ends of the reel for operating the tines on the respective sweeps in opposite directions in sequence.

3. In a harvester gathering reel having supports and driving means and a series of angularly related sweeps; spaced hooking elements mounted on the front face of each sweep with the hooking elements on the respective sweeps of the series operating in opposite directions and transversely to the path of travel of the reel, to respectively engage under fallen grain the lay of which is of opposite angularities relative to the path of travel of the reel, means for normally retracting said hooking elements, and means cooperative between the supports and said hooking elements for advancing the hooking elements on respective sweeps in sequence in opposite directions as the sweeps approach their lowermost positions, and for releasing the hooking elements for retraction when said lowermost positions have just been passed to prevent breaking or tearing up of the grain stalks while advancing to the cutter of the harvester, and raising the stalks for advance to the cutter by the next following sweep.

ARTHUR D. DOUGLAS.

REFERENCES CITED

The following references are of record in the file of this patent:

UNITED STATES PATENTS

| Number | Name | Date |
| --- | --- | --- |
| 670,662 | Bransgrove | Mar. 26, 1901 |
| 907,966 | Campbell | Dec. 29, 1908 |
| 2,252,180 | Hume | Aug. 12, 1941 |